United States Patent [19]

Craycroft

[11] Patent Number: 5,856,826
[45] Date of Patent: Jan. 5, 1999

[54] METHOD AND APPARATUS FOR ORGANIZING WINDOW GROUPS AND WINDOWS IN A TABLE

[75] Inventor: Timothy J. Craycroft, Cupertino, Calif.

[73] Assignee: Apple Computer, Inc., Cupertino, Calif.

[21] Appl. No.: 944,713

[22] Filed: Oct. 6, 1997

Related U.S. Application Data

[63] Continuation of Ser. No. 540,010, Oct. 6, 1995.

[51] Int. Cl.$^6$ ...................................................... G06F 3/00
[52] U.S. Cl. ........................... 345/346; 345/344; 345/342
[58] Field of Search ...................................... 345/326–358

[56] References Cited

U.S. PATENT DOCUMENTS

| | | | |
|---|---|---|---|
| 4,555,775 | 11/1985 | Pike | 395/344 |
| 4,574,364 | 3/1986 | Tabata et al. | 395/344 X |
| 4,890,257 | 12/1989 | Anthias et al. | 395/344 |
| 5,121,478 | 6/1992 | Rao | 395/340 |
| 5,390,295 | 2/1995 | Bates et al. | 395/340 |
| 5,412,776 | 5/1995 | Bloomfield et al. | 395/340 |
| 5,499,334 | 3/1996 | Staab | 395/340 |
| 5,544,300 | 8/1996 | Skarbo et al. | 395/340 |
| 5,546,528 | 8/1996 | Johnston | 395/344 |
| 5,572,649 | 11/1996 | Elliot et al. | 395/340 |
| 5,577,187 | 11/1996 | Mariani | 395/340 |
| 5,600,346 | 2/1997 | Kamata et al. | 395/340 |

OTHER PUBLICATIONS

Microsoft Press Computer Dictionary, Microsoft Press, p. 24, 1994.

Foley et al., "Computer Graphics: Principles and Practice", 2md ed., Addison–Wesley Pub. Co., pp. 435–450, Nov. 1993.

Newton, "Newton's Telecom Dictionary", API, p. 1, Nov. 1993.

Windows 3.1: "A Developers Guide", Jeffrey M. Richter, 1992, 2nd Edition, pp. 32–35.

Programmer's Guide to the EGA, VGA, and Super VGA Cards, "Principles of Computer Graphics", Richard F. Ferraro, 1994, 3rd Edition, pp. 115–118.

*Primary Examiner*—John E. Breene
*Attorney, Agent, or Firm*—Cesari and McKenna, LLP

[57] ABSTRACT

"A method and apparatus for organizing windows to be displayed on a screen of a computer system into window groups by attribute, function, content, or any arbitrary characteristic. A window's membership in a window group is also assigned a status that determines whether the window, upon selection, is displayed individually or as part of that group. Each window may simultaneously belong to a plurality of window groups. A data structure may be formed in a table where windows represent rows and window groups represent columns".

18 Claims, 4 Drawing Sheets

METHOD AND APPARATUS FOR ORGANIZING WINDOW GROUPS AND WINDOWS IN A TABLE

This application is a continuation of Ser. No. 08/540,010, filed Oct. 6, 1995.

FIELD OF THE INVENTION

The present invention relates generally to the organization and display of windows on a display screen of a computer system. More specifically, the present invention relates to a method and apparatus for grouping windows by any arbitrary characteristic.

BACKGROUND OF THE INVENTION

A computer system typically includes a monitor having a display screen for presenting information, such as text and images, to the user. The display screen can be configured into a window environment in which separate areas of the display screen, called windows, are established. Each window, which is typically rectangular in shape, can present or represent different information or different views of the same information. Examples of popular software systems that employ window environments are the System/7® operating system developed by Apple Computer, Inc. and the Microsoft Windows ® operating system, which is commercially available from Microsoft Corporation.

A window manager controls the size and position of each window on the display screen. The window manager is a set of system software routines, located within the computer's operating system, that is responsible for managing the windows that the user views during operation of the computer system. The window manager keeps track of the location and size of each window and the window areas that must be drawn and redrawn in response to commands issued by application programs executing on the computer system. These commands, which may include move windows, change window sizes, etc., are generated and sent by the application program to the window manager via application programming interfaces (APIs). APIs typically include a collection of system calls requesting services from the operating system.

Each application program executing on the computer system typically defines a set of windows that are associated with that application. For example, a drawing application may define a window into which a user "draws" images as well as palette windows which contain tools, such as pencil, color, etc., for drawing those images. Similarly, a word processing application may have a window into which text is entered as well as palette windows containing the tools, such as cut, paste, paragraph numbering, etc., available to manipulate the text.

The window manager typically stores these windows in layers defined by and associated with those application programs. A window layer is simply a set of all the windows associated with a single application program. The window manager maintains these window layers in a block of memory.

In addition to controlling the size and position of each window on the display screen, the window manager also controls the front-to-back order of the windows displayed on the display screen. This front-to-back positioning is referred to as the window's "z-order", which is named for the z-axis of a three-dimensional coordinate system, where z is the coordinate extending into the computer screen. In particular, a number is assigned by the operating system to each layer of windows describing its priority class relative to the other window layers. A window layer's priority class defines where in the z-order the window layer can be placed. For example, a window layer of priority class "2", e.g. a screen saver, always appears in front of a window layer of priority class "3", e.g. an application program, while multiple window layers of priority class "3", e.g. a word processing application and a spreadsheet application, can overlie each other in the z-order.

In general, the window manager draws the entire layer of windows associated with a currently executing application program at the front of the computer screen for display to a user, provided that the priority class of the window layer is the same as or higher than the priority class of any other window layer on the display screen. For example, if the user initiates a word processing operation, then the layer of windows associated with a word processing application is brought to the front of the screen. Behind that layer of word processing windows is a layer of windows associated with the last executed application program, such as a drawing application, which is assigned to the same priority class as the word processing layer of windows. Behind the layer of drawing windows is a third layer of windows from the application program used before the drawing application, such as a spreadsheet application.

When a user selects a window that is not displayed on the front of the screen, the window manager brings that window and all of the windows in that layer to the front of the screen, provided that the priority class of the selected window layer is the same as or higher than the window layer being displayed. If, during a word processing task, for example, the user selects a window from the spreadsheet application, the window manager re-draws the screen so that all of the windows from the spreadsheet application are at the front of the screen. This re-drawing of the windows displayed on the screen also alters the z-ordering of windows by placing the spreadsheet layer of windows ahead of the word processing layer of windows.

Such re-positioning of window layers by application program, however, may be annoying to a user wanting to work with only a particular window or windows of the layer. For example, the layer containing the spreadsheet windows may include two data field windows, e.g. $D_A$ and $D_B$, and three palette windows, $P_1$, $P_2$ and $P_3$, where palette windows $P_1$ and $P_2$ contain tools that apply only to data field $D_A$ and palette window $P_3$ contains tools that apply only to data field $D_B$. As noted, the window manager arranges all of these windows into a single layer and when the user selects any spreadsheet window, e.g., $D_B$, all of these windows are brought to the front of the display screen, even though the user may want to work only with window $D_B$. The screen is thus crowded with many more windows than the user desires.

A programmer could create a predetermined layer of windows "manually", i.e., by having the application program issue individual calls to the window manager to bring particular windows to the front of the display screen. Such a series of distinct procedures, however, results in significant consumption of resources by the operating system and may be distracting to the user as the window environment is altered piece-by-piece. Furthermore, these predetermined layers only include windows defined by that application.

SUMMARY OF THE INVENTION

It is an object of the present invention to provide a more efficient window environment for a user.

It is a further object of the present invention to provide a technique for enhancing the performance characteristics of a computer.

Briefly, the invention comprises a method and apparatus for organizing windows into window groups by attribute, function, content or any arbitrary characteristic and, further, for displaying those windows either individually or as a group. Each window group may contain any number of windows and each window can be a member of any number of groups or can be defined independently of any window group. A window's membership in a window group is also assigned a status that determines whether the window, upon selection, is displayed individually or as part of that group. The grouping of windows and the manner in which they are displayed, i.e., by group or individually, improves the efficiency of a user's window environment by displaying only those windows relating to the task being performed.

Specifically, an application organizes the windows into these predetermined or "attribute-specific" window groups using an arrangement of data structures whose contents are manipulated by novel application programming interface (API) system calls to a window manager. The novel APIs include system calls for creating and disposing of window groups, adding and removing windows to and from a window group and selecting a window for display on the front of the screen either individually or as a group.

In the illustrative embodiment, the data structures, which are a series of information storage locations or bit cells, are arrayed into a pair of data tables. The rows of the tables represent the windows defined by the application programs executing on the computer system and the columns represent the window groups organized by those applications. In the first data table, the state of each bit cell, which is identified by the intersection of a window row with a window group column, signifies membership of the corresponding window in the corresponding window group. In the second data table, the state of each bit cell, which is again identified by the intersection of a window row with a window group column, signifies the membership status of that window in that window group.

According to an aspect of the invention, the membership status of a window in a group may be either active or passive. An active window member of a group "pulls" all of the windows within that group for display on the front of the display screen whenever the active window is selected by the user. In contrast, a passive window member ignores the other windows in that group when being moved to the front of the screen by the window manager. A window also may be an active member of some window groups and a passive member of others. In the this situation, upon selection of the window, all windows from the window groups in which the selected window is an active member are pulled to the front of the screen.

In the illustrative embodiment, upon selection of a particular window by the user, the window manager compares the two rows of bit cells corresponding to that window from the membership data table and the membership status data table. By incrementally performing a logical operation on each bit cell of these two rows, such as an AND operation, a third data structure or row, signifying only those window groups in which the selected window is an active member, is formed.

This third "active membership" row is then incrementally compared to each of the rows from the window membership data table to identify each window that is a member of a window group in which the selected window is an active member. Once these windows have been identified, the display screen is redrawn so that these windows, i.e., the selected window and all other windows that are members of window groups in which the selected window is an active member, are brought to the front of the display screen.

Advantageously, the invention provides a method that efficiently organizes and displays only those windows needed by the user. The organization of windows into predetermined groups by attribute, function, content or any arbitrary characteristic provides a more efficient use of the display screen than previous application-oriented window layers. In addition, by having the window manager move the windows by group onto the display screen in a single operation, rather than manually issuing individual calls for each window, a significant gain in performance of the computer system can be realized.

BRIEF DESCRIPTION OF THE DRAWINGS

The above and further advantages of the invention may be better understood by referring to the following description in conjunction with the accompanying drawings, in which.

DETAILED DESCRIPTION OF THE PREFERRED EMBODIMENTS

Figure 1:
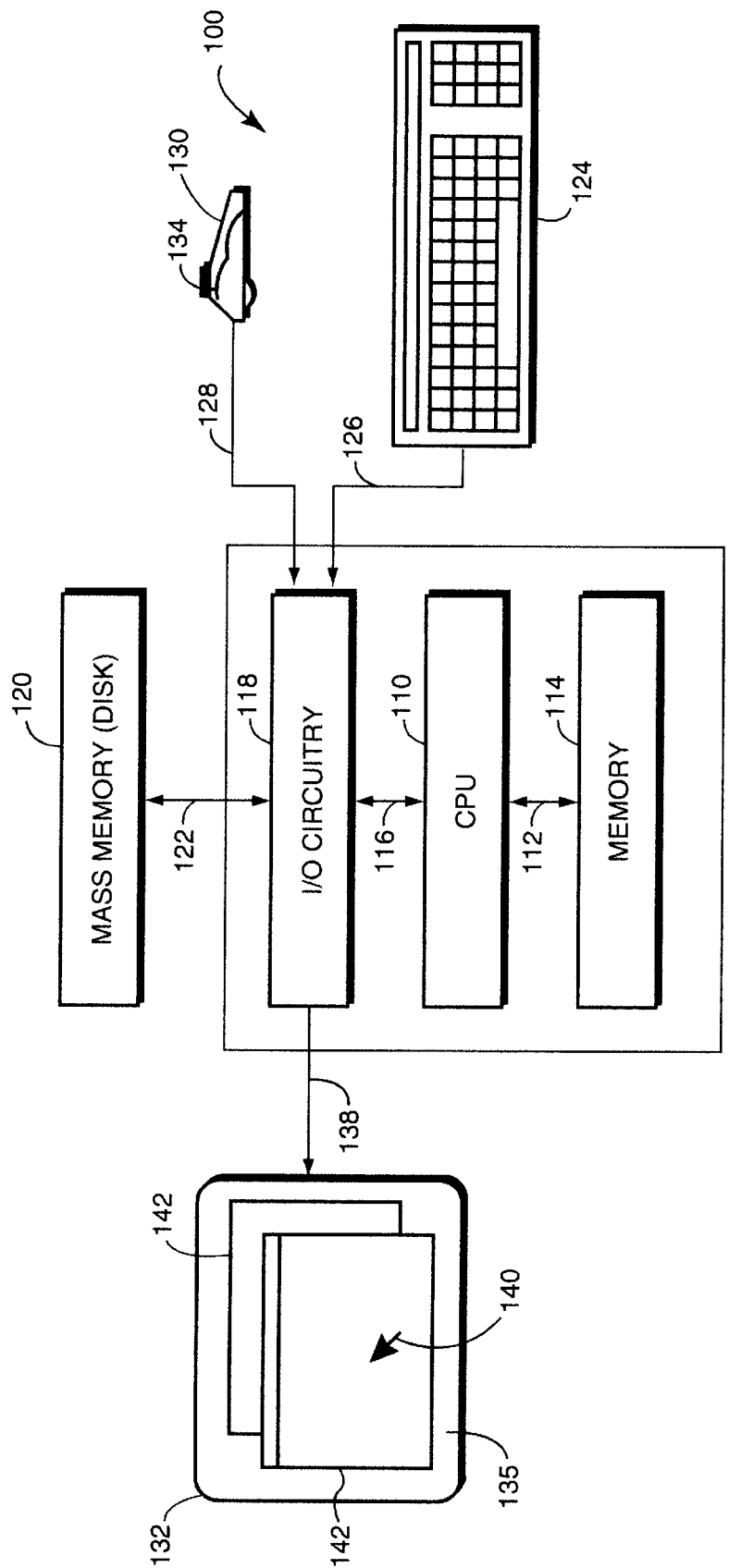
FIG. 1 is a block diagram of a computer system, such as a personal computer system, on which the invention may advantageously operate.

FIG. 1 illustrates a computer system 100 comprising a central processing unit (CPU) 110 coupled between a memory 114 and an input/output (I/O) circuitry 118 by bi-directional buses 112 and 116, respectively. The memory 114 typically comprises random access memory (RAM) for the temporary storage of information, including an application program and an operating system (FIG. 2), and read only memory (ROM) for permanent storage of the computer's configuration and basic operating commands. As further described herein, the application program and the operating system interact to control the operations of the CPU 110 and the computer system 100.

The I/O circuitry 118 is, in turn, connected to a mass storage unit 120 such as a disk drive, via bi-directional bus 122. Cursor/pointer control devices, such as a keyboard 124 and a mouse 130, connect to the I/O circuitry 118 via cables 126 and 128, respectively. The mouse 130 typically contains at least one button switch 134 operated by a user of the computer system 100.

A conventional display monitor 132 having a display screen 135 is also connected to the I/O circuitry 118 via cable 138. A pointer or cursor 140 is displayed on the screen 135 and its position is controllable via the mouse 130 or the keyboard 124, as is well-known in the art. Significantly, a window environment is displayed on the display screen 135 of the monitor 132. The window environment includes a plurality of windows 142.

In particular, the I/0 circuitry 118 receives information, such as control and data signals, from the mouse 130 and the keyboard 124, and provides that information to the CPU 110 for storage on the mass storage unit 120 or for display on the screen 135. It is also to be understood that the I/O circuitry 118 contains the necessary hardware, e.g., buffers and adapters, needed to interface with the mouse 130, the keyboard 124 and the display monitor 132.

The computer system 100 is preferably a personal computer of the Macintosh® series of computers sold by Apple Computer, Inc., although the invention may also be practiced in the context of other types of computers, including the IBM® series of computers sold by International Business Machines Corp. These computers have resident thereon, and are controlled and coordinated by, operating system software, such as the Apple® System 7®, IBM OS2®, or the Microsoft® Windows® operating systems.

Figure 2:
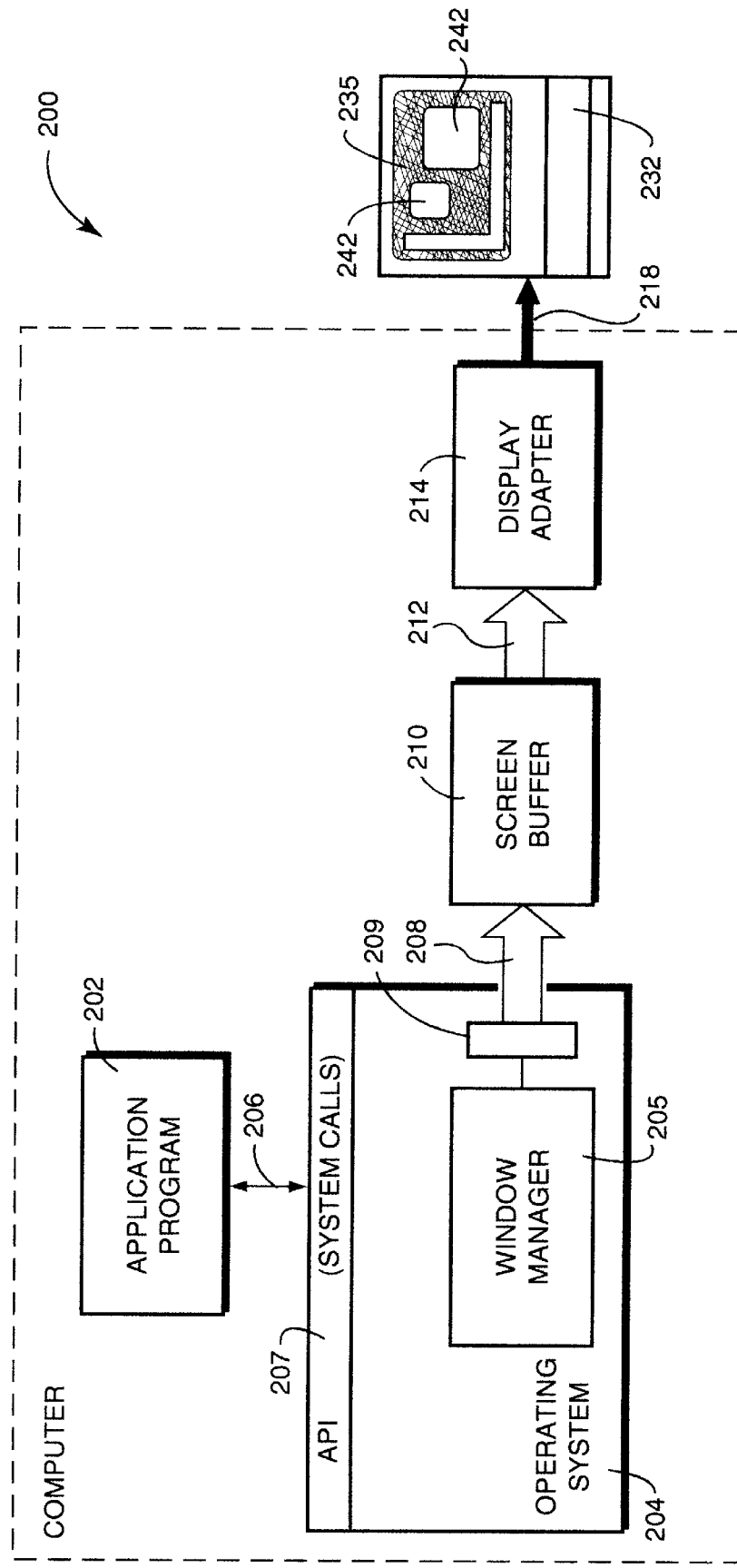
FIG. 2 is a block diagram showing the relationship of an operating system, an application program, a screen buffer and a display screen of the computer system of FIG. 1.

FIG. 2 is a highly schematized illustration of the interaction of an application program 202 and an operating system 204 of a computer system 200, which is similar to, and has equivalent elements of, the computer system 100 of FIG. 1. As noted, the application program 202 executes on the computer system 200. The application program 202 and the operating system 204 interact (via arrow 206), via system calls of an application programming interface (API) layer 207, to control the operations of the computer system 200. Beneath the API layer 207 are system facilities, including a window manager 205 which, inter alia, directly implements those system calls.

The lower-layer of the operating system 204 includes device drivers (not show) for interfacing directly with the computer hardware (not shown). For each physical device, such as the mass storage unit 120 (FIG. 1), a device driver is provided to accept requests, to read or write data or to determine the status of the devices. Communication between the physical devices and CPU 110 (FIG. 1) may be effected either through polling of the device drivers or via interrupts.

Specifically, the window manager 205 is a set of software routines within the operating system 204 that is responsible for managing windows 242 displayed on a display screen 235 and viewed by the user during operation of the application program 202. The window manager 205 acts in direct response to system calls sent from the application program 202 to the operating system 204 via the API layer 207.

In order to display information in a window 242 on a display screen 235, the application program 202 generates and sends system calls to the window manager 205 through the API layer 207. The window manager 205 uses a graphics system 209 within the operating system to draw to the display screen 235. The graphics system 209, in turn, stores the information to be displayed directly (via arrow 208) into a screen buffer 210. Under the control of various hardware and software in the computer system 200, the contents of the screen buffer 210 are read out of the buffer 210 and provided, as indicated schematically by arrow 212, to a display adapter 214. The display adapter 214 contains hardware and software (sometimes in the form of firmware) which converts the information in the screen buffer 210 to a form which can be used to drive the display screen 235 of a monitor 232, which is connected to the display adapter 214 by an adapter cable 218.

Specifically, the invention herein features the provision of novel APIs, which cause the window manager 205 to organize and display the windows 242 in such a manner as to enhance the ability of a user to interact with the computer system 200. This new behavior of the computer system 200 is achieved, in part, by establishing an arrangement of data structures for each individual window 242 which, in accordance with the invention, signify the window's membership and its status in various window groups.

As noted, each application program executing on the computer system typically defines a set of windows associated with that application. Each window, moreover, is assigned a unique a token or handle identifying the window, e.g., WindowRef$_N$, where "N" refers to the sequential order in which the window was created. The set of windows associated with the application is typically arranged by the window manager into a layer of windows and stored in a portion of memory allocated to the window manager. The entire layer of windows is simultaneously displayed on the screen upon selection of any individual window. Such an application-specific layering and displaying of windows, however, often manifests as a crowded and inefficient window environment for a user.

In accordance with the invention, a novel method and apparatus for arranging windows into window groups by attribute, function, content or any arbitrary characteristic is provided to display a selected window to the user either individually or as a group.

Figure 3:
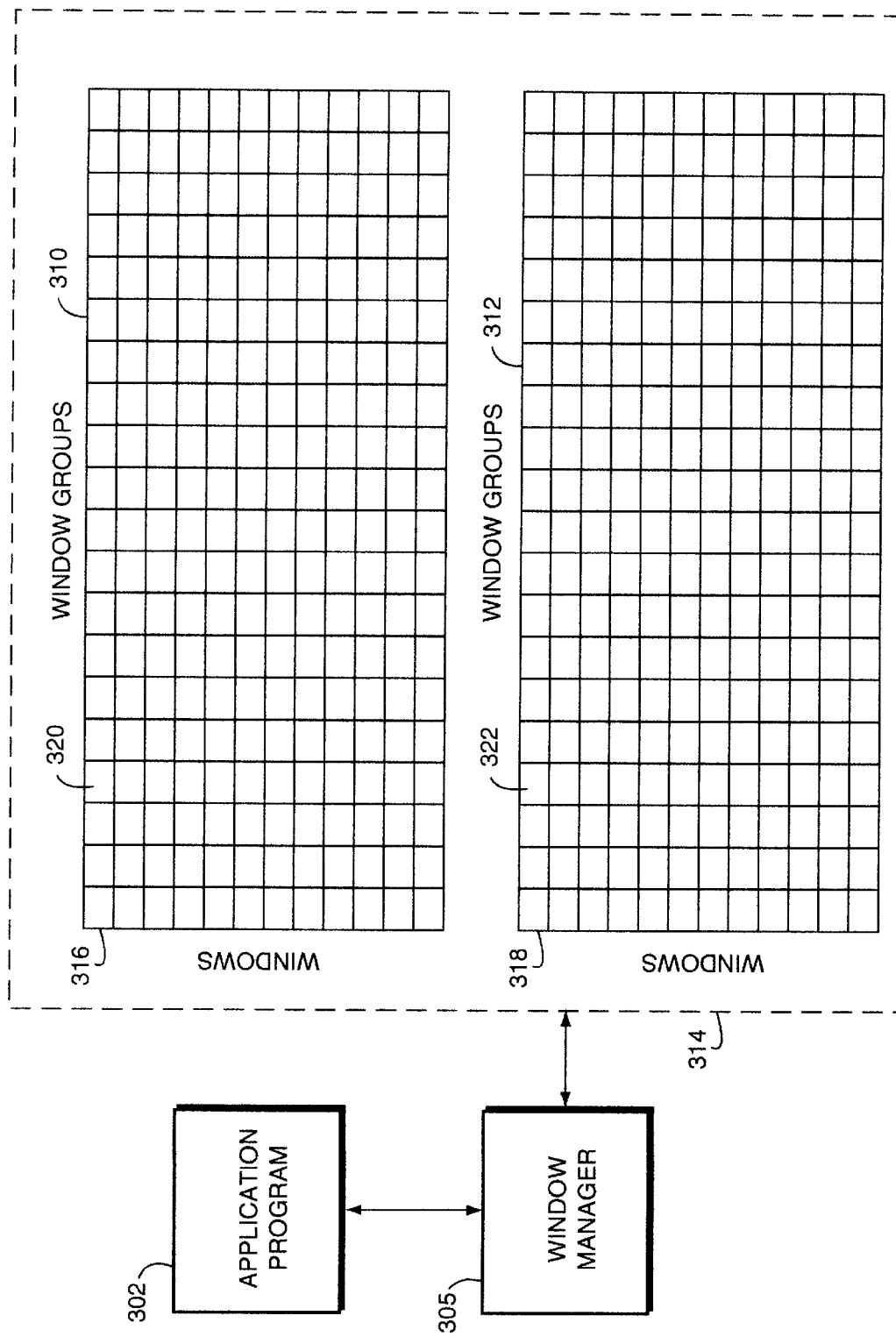
FIG. 3 shows an illustrative arrangement of window data structures residing in the memory of the computer system of FIG. 1.

FIG. 3 is a highly schematized diagram depicting an illustrative arrangement of data structures in a portion of memory 314 that are manipulated by an application program 302 through novel API system calls to a window manager 305. As described in more detail below, these system calls include the following (the arguments have been omitted for simplicity):

NewWindowGroup ( );

DisposeWindowGroup ( );

AddWindowToGroup ( );

RemoveWindowFromGroup ( ); and

SelectWindowGroup ( ).

In the illustrative embodiment shown in FIG. 3, the arrangement of data structures comprises a window membership table 310 and a membership status table 312. Each table 310, 312 comprises a plurality of window rows and window group columns. Each window row of the window membership data table 310 and the membership status table 312 is represented by a thirty-two bit cell data structure 316, 318, respectively, wherein each cell contains one bit. The intersection of a window row and a window group column identifies a particular bit cell 320, 322 of the tables 310, 312.

It should be understood that the window rows may comprise data structures having any number of information storage locations or bit cells. It should be further understood that the rows of bit cells associated with a window may be organized into other data arrangements besides data tables. For example, in a preferred embodiment, rather than arranging the data structures into data tables, each window is assigned a discrete portion of memory which contains only the rows associated with that window. However, for ease of description and depiction, the data arrangement described herein shall comprise data tables.

In the window membership table 310, the state of each bit cell 320 signifies the membership of the window corresponding to that row in the window group corresponding to that column. Preferably, if a window is a member of a window group, the bit cell 320 corresponding to that window row and that window group column is asserted, e.g., set to "1". If the window is not a member of the window group corresponding to that bit cell 320, then the bit cell 320 is de-asserted. e.g., set to "0".

The state of each bit cell 322 in the membership status table 312 represents the "active" or a "passive" membership status of a window in a window group. Active membership status in a window group may be indicated by asserting the bit cell 322 corresponding to that window group column to, e.g., "1". Passive membership in a window group may be signified by de-asserting the bit cell 322 to, e.g., "0". The remaining bit cells 322 in the membership status table 312, i.e., the bit cells 322 corresponding to those window groups in which the window is not a member, are also de-asserted.

To organize windows into a window group, the application program 302 issues a system call, preferably identified as NewWindowGroup, instructing the window manager 305 to assign a column of the window membership table 310 and a corresponding column of the membership status table 312 to a particular window group. A token or handle, such as WGroupRef$_N$, may be used to identify the window group being created by the application program, where "N" refers to the sequential order in which the window group was created.

Once the column has been identified with a particular window group, the application program 302 issues another system call, preferably identified as AddWindowToGroup, using WGroupRef$_N$ and WindowRef$_N$ as its arguments. The AddWindowToGroup system call directs the window manager 305 to assert the bit cell 320 in the window membership table 310, associated with that window and that window group, e.g., WindowRef$_1$ and WGroupRef$_1$. By asserting the bit cell 320, the window manager 305 signifies that the window is a member of the window group. In this manner, the application program 302 can direct the window manager 305 to create a window group comprising, for example, the first, sixth, eleventh and twenty-second windows, by asserting those bit cells 320 in the first column of the window membership data table 310 and de-asserting all other bit cells in that column.

The application program 302, still through the AddWindowToGroup system call, then instructs the window manager 305 to assert/de-assert the corresponding column of bit cells 322 in the membership status table 312 to either a "1" or a "0". Asserting/de-asserting of bit cells 322 in the membership status table 312 signifies whether the window is an active or a passive member of the window group. For example, the application program 302 may direct the window manager 305 to assert only the first and eleventh bit cells 322 in the first column of the membership status table 312 to, e.g., "1", indicating that those windows are active members of the window group being created, whereas the windows associated with the sixth and twenty-second bit cells are passive members of the window group. The remaining bit cells 322 in the membership status table 312, i.e., the bit cells 322 corresponding to those windows that are not members of the window group, are de-asserted to, e.g., "0."

Similarly, the application program 302 may direct the window manager 305 to assign the second column of bit cells 320, 322 in the window membership table 310 and the membership status table 312 to another window group, e.g. WGroupRef$_2$, by again issuing the NewWindowGroup system call. Using the AddWindowToGroup system call, windows may be similarly added to that window group by asserting the appropriate bit cells 320 in the window membership table 310 to, e.g., "1". Moreover, these windows may be designated as either active or passive members of this second window group, by asserting/de-asserting the appropriate bit cells 322 in the membership status table 312.

It should be appreciated that any window that is a member of the first window group, WGroupRef$_1$, may again be made a member of the second window group, WGroupRef$_2$, by asserting the corresponding bit cell 320 in the window membership table 310 to, e.g., "1". For example, the second window group may include the second, sixth, twenty-second and fiftieth windows. Thus, the first window group and the second window group both have the sixth and twenty-second windows as members.

This process is repeated until each application 302 executing on the computer system 200 has defined all of the windows associated with that application 302 and each application 302 has instructed the window manager 305, via the system calls NewWindowGroup and AddWindowToGroup, to enter data in the window membership table 310 and the membership status table 312, in accordance with the window groups being organized by that application 302.

Individual windows can thus be grouped by the application program 302, not solely into layers associated with each application 302, but into predetermined window groups based on attribute, function, content or any arbitrary characteristic. A window group, moreover, may contain any number of windows and a particular window may be a member of more than one group.

Another novel API of the invention, preferably called DisposeWindowGroup, directs the window manager 305 to erase a particular window group. In response to this system call, the window manager 305 de-asserts all of the bit cells 320, 322, in the column associated with the window group to be disposed, to, e.g., "0". The column of bit cells 320 and 322 in both the window membership data table 310 and the membership status table 312 are thereafter available for use by another window group.

Still another novel API of the invention is RemoveWindowFromGroup. This system call directs the window manager 305 to remove a particular window from a window group using the WindowRef$_N$ and WGroupRef$_N$ as arguments. The window is removed by de-asserting to, e.g., "0", the corresponding bit cells 320, 322 in both the window membership table 310 and the membership status table 312.

The AddWindowToGroup system call may also be used to change the active/passive status of a window already assigned to a window group. Specifically, the application 302 directs the window manager 305 to add the window with a different membership status. Since the window is already a member of the window group, the window manager 305 only changes the state of the bit cell 322 in the membership status table 312 corresponding to the status of that window's membership in the group.

Figure 4:
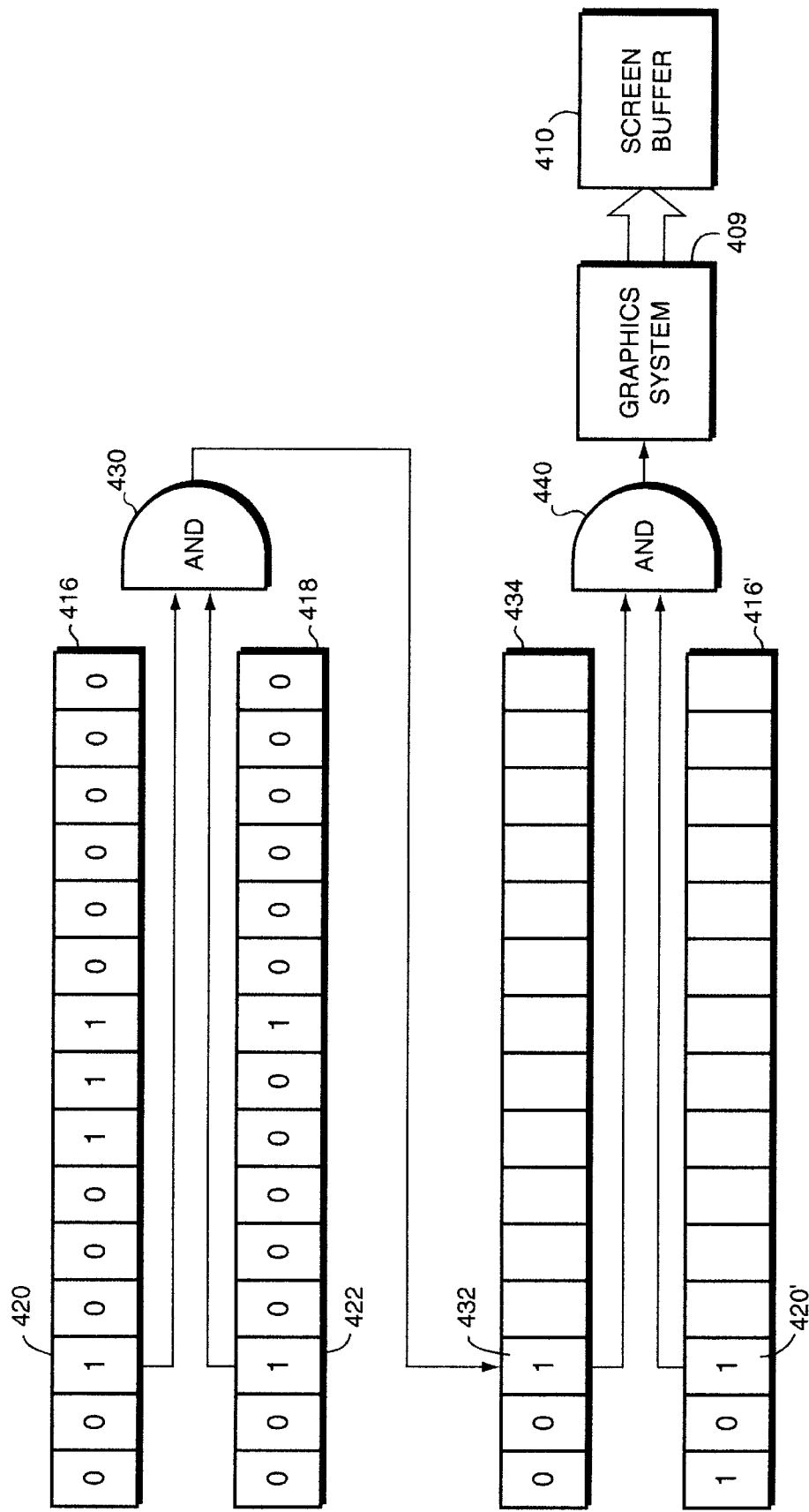
FIG. 4 shows the interaction between a window manager and an arrangement of window data structures.

FIG. 4 is a highly schematized diagram depicting the manner in which the application, such as the application program 202 of FIG. 2, instructs the window manager 205 to display a window either individually or as a group upon the selection of a particular window by a user. When the user selects a window displayed on the display screen 235, using the mouse 130 or the keyboard 124, the application program 202, which defined the selected window, issues a system call, preferably identified as SelectWindowGroup using WindowRef$_N$ as its argument, to the window manager 205.

The SelectWindowGroup system call first directs the window manager 305 to compare the two window rows in memory 314 corresponding to that window, i.e., the associated row in the window membership table 310 and the associated row in the membership status table 312. Specifically, the window manager 305 incrementally retrieves each bit from each cell 420 of the window membership data structure 416 corresponding to the selected window and the corresponding bit, i.e., from the same column, from the cell 422 of the membership status data structure 418 corresponding to the selected window. In the preferred embodiment, a logical AND operation is performed on these two bits in accordance with an AND instruction executed by the CPU 110. In an alternative embodiment, the AND operation may be implemented using a first AND gate 430. The result of the first AND operation on these two bits and the remaining corresponding bits are placed in corresponding bit cells 432 of a resultant data structure 434.

Specifically, the resultant data structure 434 is a series of thirty-two bit cells 432 in which each bit cell 432 corresponds to a particular window group. Each bit cell 432 may be asserted to "1"or "0". In accordance with the AND operation performed by the first AND gate 430, the bit cell 432 is asserted to, e.g., "1", only if the selected window is an active member of the corresponding window group and is otherwise de-asserted to, e.g., "0", if the window is a passive member or a non-member of the corresponding window group. The window manager 305 thus creates an additional data structure residing in the memory 314, which indicates only those window groups in which the selected window is an active member.

To determine which other windows in the memory 314 belong to window group(s) in which the selected window is an active member, a second comparison is made between the resultant data structure 434 and the window rows of the window membership table 310, other than the row associated with the selected window. Preferably, the comparison is performed with one other window row at a time.

Specifically, the window manager 205 incrementally retrieves the bit from each bit cell 432 of the resultant data structure 434 and a corresponding bit from the bit cell 420' of the window membership data structure 416' being compared. These two bits are then logically compared, either by using a software instruction or a hardware circuit, e.g., a second "AND" gate 440.

If the result of the second AND operation is "1", then the window being compared is a member of a window group in which the selected window is an active member. Accordingly, this window, in addition to the selected window, will be "pulled" to the front of the display screen 235. By repeating this comparison process between the resultant data structure 434 and each window row of the window membership table 310 in the memory 314, the window manager 305 identifies all of the windows that are members of the groups in which the selected window is an active member. These windows are then sent to a graphics system 409, which, in turn, stores this information in a screen buffer 410, for display on the front of the display screen 235.

In an alternate embodiment, rather than loading the results of the first AND operation into a resultant data structure, the results may be immediately compared with the window rows of the window membership table.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for organizing windows displayed on a screen of a computer, the method comprising the steps of:
    defining a plurality of predetermined window groups;
    sorting windows into the predetermined window groups, wherein a given window may belong to more than one window group and each window group contains at least one window; and
    assigning membership status to each window of a group, wherein a window's membership status in a given window group determines whether, in response to selection of the window, to display either the selected window individually or all windows of the given window group.

2. The method of claim 1 wherein the step of sorting windows into predetermined window groups comprises the steps of:
    organizing the windows into the predetermined window groups using an arrangement of data structures; and
    manipulating the contents of the data structures using application programming interface (API) system calls.

3. The method of claim 2 wherein the step of organizing further comprises the step of arraying the data structures into a pair of data tables having a plurality of rows and columns, wherein the rows represent the windows and the columns represent the window groups.

4. The method of claim 3 wherein each data structure comprises a plurality of bits and wherein the step of organizing further comprises the step of signifying membership of a window in a window group by asserting a bit identified by the intersection of the window row with the window group column in a first data table.

5. The method of claim 4 wherein the step of assigning membership status to each window of a group further comprises the step of asserting a bit identified by the intersection of the window row with the window group column in a second data table.

6. The method of claim 5 wherein the step of manipulating comprises the steps of:
    selecting a window; and
    incrementally performing a first logical operation on a row of bits of the first data table and a row of bits of the second data table associated with the selected window to identify the window groups of which the selected window is an active member.

7. The method of claim 6 further comprising the step of loading the results of the logical operation in an active/passive data structure, having a plurality of bits, wherein each bit is associated with a window group.

8. The method of claim 6 further comprising the step of incrementally performing a second logical operation on the bits resulting from the first logical operation and the bits in the rows of the first data table associated with every window other than the selected window to identify the windows that belong to the window groups in which the selected window is an active member.

9. The method of claim 7 further comprising the step of incrementally performing a second logical operation on the bits of the active/passive data structure and the bits in the rows of the first data table associated with every window other than the selected window to identify the windows that belong to the window groups in which the selected window is an active member.

10. The method of claim 9 further comprising the step of displaying on the display screen the window group or groups in which the selected window is an active member.

11. The method of claim 6 wherein the first logical operation is an AND operation.

12. The method of claim 8 wherein the second logical operation is an AND operation.

13. The method of claim 9 wherein the second logical operation is an AND operation.

14. An apparatus for organizing windows displayed on a screen of a computer, the apparatus comprising:
    a processor;
    an operating system cooperating with the processor to control the screen;

at least one application program cooperating with the operating system to define the windows that may be displayed on the screen;

means for organizing windows into a plurality of window groups, each window group containing at least one window and a given window capable of belonging to more than one group; and means for assigning membership status to each window of a group, such that a window's membership status in a given window group determines whether, in response to selection of the window, to display either the selected window individually or all windows of the given window group.

15. The apparatus of claim 14 wherein the means for organizing comprises a plurality of data structures located in a memory for grouping the windows by attribute, function, content or any arbitrary characteristic and the apparatus further comprises a window manager for drawing the created windows for display on the screen and for manipulating the contents of the data structures when grouping the windows.

16. The apparatus of claim 14 wherein the windows are arranged as pairs of data structures per window.

17. The apparatus of claim 14 wherein the windows are arranged as a pair of data tables having a plurality of rows and columns, wherein the rows represent the windows and the columns represent the window groups.

18. A method for organizing windows displayed on a screen of a computer, the method comprising the steps of:

sorting windows into predetermined window groups, wherein each window group contains at least one window; and assigning membership status to each window of a group to display either the window or the window group, wherein the step of sorting comprises:

organizing the windows of the predetermined window groups using an arrangement of data structures;

manipulating the contents of the data structures using application programming interface (API) system calls; and arraying the data structures into a pair of data tables having a plurality of rows and columns, wherein the rows represent the windows and the columns represent the window groups.

\* \* \* \* \*